H. A. CHRISTY.
CAR DOOR.
APPLICATION FILED JULY 22, 1909.
955,381.
Patented Apr. 19, 1910.
2 SHEETS—SHEET 1.
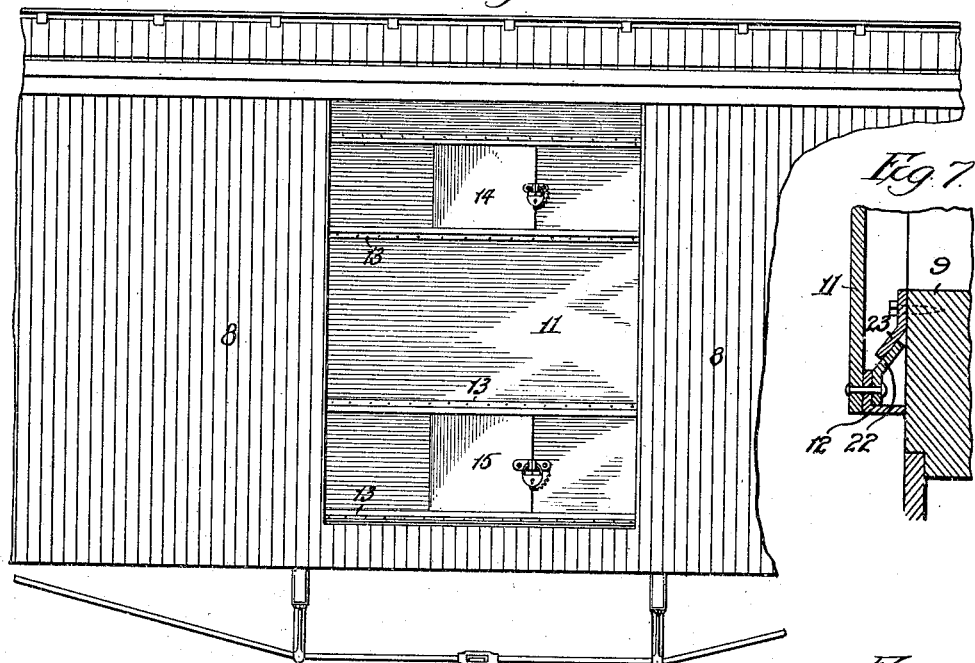
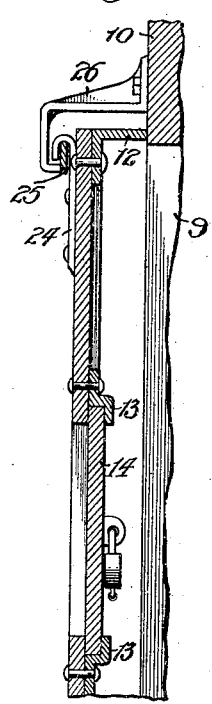
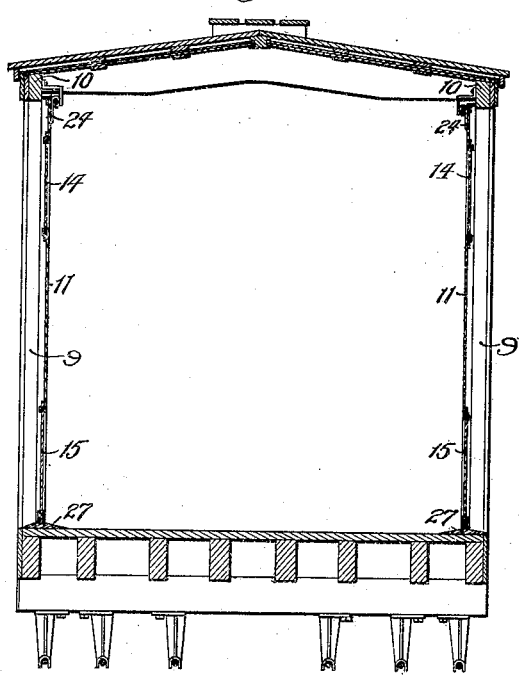
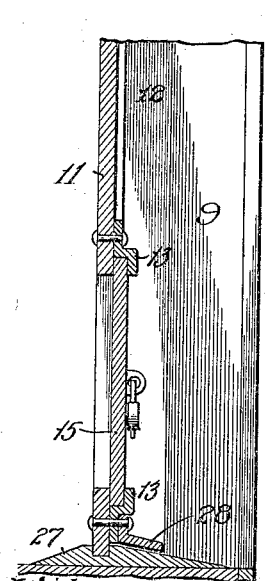

H. A. CHRISTY.
CAR DOOR.
APPLICATION FILED JULY 22, 1909.
955,381.
Patented Apr. 19, 1910.
2 SHEETS—SHEET 2.
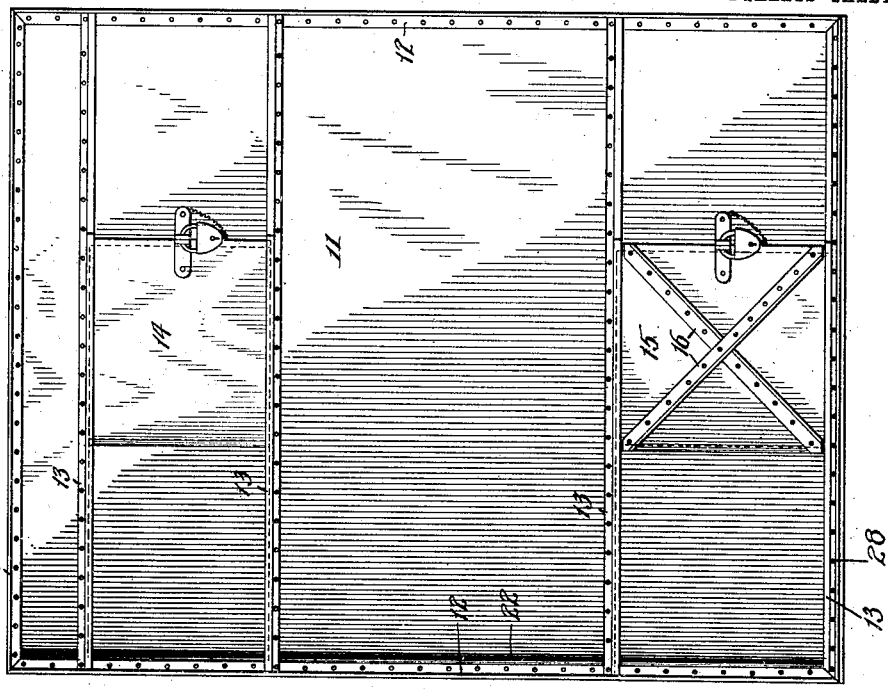
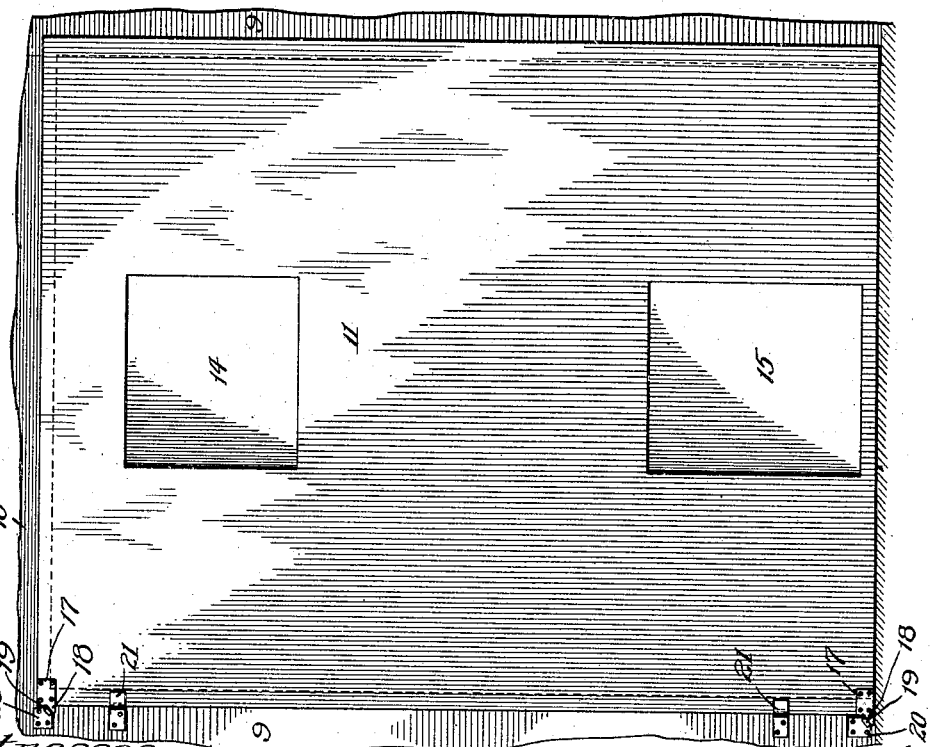

UNITED STATES PATENT OFFICE.

HENRY A. CHRISTY, OF KENILWORTH, ILLINOIS.

CAR-DOOR.

955,381.  Specification of Letters Patent.  Patented Apr. 19, 1910.

Application filed July 22, 1909.  Serial No. 509,009.

*To all whom it may concern:*

Be it known that I, HENRY A. CHRISTY, a citizen of the United States, residing at Kenilworth, in the county of Cook and State of Illinois, have invented certain new and useful Improvements in Car-Doors, of which the following is a specification.

Freight cars are especially constructed for handling certain classes of freight, but a large percentage of freight is carried in cars generally designated as box cars. Among the miscellaneous freight shipped in the same type of cars is grain, ore, lumber, and package freight or general merchandise.

To enable grain to be shipped in the ordinary box car especial provisions must be made to prevent the escape of the grain which would not be sufficiently safeguarded by the ordinary outside sliding door. It has been common practice, therefore, to provide an inner or grain door, sometimes movably attached to and forming a part of the permanent structure of the car, and sometimes a mere temporary door is provided which is discarded when the car is unloaded.

The carrying capacity of all classes of freight cars has been very largely increased during the last few years, that is, from 20,000 to 30,000 pounds to as high as 100,000 pounds, the bulk of the load being increased to correspond with the carrying capacity of the car, and therefore in the shipment of grain the grain line or surface of the load is now much higher than formerly, and, in fact, extends as near the roof of the car as possible, leaving only space enough for inspection. Therefore, it is necesary to provide a grain door which shall cover practically the whole of the door opening in the side of the car.

The vertically sliding grain doors heretofore employed have contained limitations imposed by their structure, that is to say, if made of a single piece their height cannot be greater than one-half the width of the car, as they are usually moved up along guides and secured under the car roof to the car-lines when the car is to be used for general merchandise or package freight. Consequently, to enable the car to be loaded to its capacity with grain, the shipper must, in addition to the ordinary sliding grain door, employ a temporary door to hold the upper part of the load, and this is usually done by nailing boards or strips to the door posts above the sliding grain door, and the sliding doors being blocked by the boards above cannot be raised or operated and are frequently damaged in the attempt to operate them. Furthermore, the usual sliding grain door if made of the size required would be too heavy to lift or handle, and when made in sections, has been found impracticable because of sticking, due to being clogged with grain. A carload of heavy grain, such as wheat or corn, exerts a great lateral pressure on the side walls of the car in the line of the doors, tending to bulge the sides, which causes the usual outside sliding door, as well as the grain door, to stick and bind. The outside door itself is, of course, subject to the danger of being derailed and its tracks and brackets broken by the shocks received by contact from vehicles and from other causes, and therefore is a constant menace, as well as a source of expense not only in the cost of switching charges and of the repairs themselves, but in delays and the like.

It is the purpose of my invention to provide a car door of general utility which shall serve all the purposes of a freight car door in the shipment of the various kinds of merchandise; to make such door a unitary structure, that is, having no detachable parts; to provide a car door which can be easily and conveniently operated and not subject to binding or sticking in its track, and which will enable grain to be loaded within the car to its full capacity, to be carried without loss by leakage, and to be easily discharged therefrom.

To accomplish the purposes of my invention I preferably make the car door of metal of commercial forms, such as steel plates and angle-bars, thereby attaining the required stiffness without excessive cost or making the door objectionably heavy. To enable the hauling of grain in cars equipped with this door, I provide the latter preferably with wickets, one affording means of ingress to the car for the purpose of inspecting the grain and to facilitate loading, and the other enabling the discharge of the contents from a point near the bottom of the load, and to such extent that the main door will be relieved of pressure and freed so that it may be fully opened. I also provide means whereby the edges of the door are drawn into close contact with the door posts and the door itself is held firmly to its support at its bottom edge so as to prevent the escape of grain.

My improved car door is illustrated in the accompanying drawings in which—

Figure 1 is an exterior elevation of one side of the car adjacent to the door. Fig. 2 is a transverse sectional elevation of the car through the doors. Fig. 3 is a broken elevation through the lower part of the door, showing the sliding section near its bottom. Fig. 4 is a similar view showing the sliding member near the top of the door. Fig. 5 is an inside and Fig. 6 an outside elevation of the door proper, the broken lines of Fig. 5 showing the door frame, and Fig. 7 is a detailed view in section, showing interlocking and wedging members applied to the door post and rear edge of the door.

In the drawings 8 represents the side wall of the car, 9 the door posts, and 10 the plates.

The body 11 of the door may be composed of one or more plates or sheets of steel, reinforced by the angle-bars 12, and Z bars 13; the bars 12 are preferably riveted to the margins of the door, mitered at the corners and having their flanges presented outwardly. The bars 13 are disposed horizontally or parallel to the top and bottom edges of the door and are so spaced as to afford guides or ways for the sliding sections 14 and 15. Section 14 is placed near the top of the door, which is cut away behind such section, and thereby affords a convenient means for ingress to the car for inspection purposes and facilitates loading by the insertion of the grain spout. Section 15 is placed at the bottom of the main door and affords a means for quickly discharging the grain sufficiently to reduce the pressure on the main door. The section 15 may be stiffened by the diagonal bars 16, and both of the sliding sections may be secured in the closed position by any suitable means, such as the hasps and pad-locks shown.

The main door is provided at its upper and lower front corners with plates 17, having projected beveled nose pieces 18, which engage beneath similar nose pieces 19 on plates 20, secured to the adjacent post 9 whereby the door will be crowded down in its closed position so as to hold the bottom of the door snugly against the floor of the car with a grain and weather tight fit. Any number of L shaped guide brackets 21 may be provided upon the adjacent door post 9 to engage the edge of the door and cause it to hug the post tightly. The rear edge of the main door is provided with a wedge piece 22 which may be in the form of a plate or strip of metal riveted to the door through one flange of the marginal angle bar, its free edge being inclined to engage beneath a similar strip 23 secured to the inner face of the door post 9 at the rear edge of the door. When the door is closed these nose pieces and interlocking members described will prevent the door working up under the vibration of the car, and will maintain its edges in contact with the door posts and thus prevent loss of grain.

As intimated in the statement of the invention, the door rests and slides on its bottom edge. For the purpose of guiding the door in its sliding movements, and at the same time permitting of the looseness necessary to enable the crowding down of the door against the threshold strip or floor of the car and also laterally against the side of the car, there are provided two or more hook plates, one of which has been shown at 24 in Fig. 4 of the drawings, secured to the inner face of the door at the top thereof, with the hook portion loosely embracing a stationary guide bar 25, suitably supported by brackets, one of which has been shown at 26 secured to the side of the car. It will here be explained that these hook plates or slides do not hang upon the guide bar 25 as a support, because the door is supported by resting on its bottom edge. The guides merely embrace the bar loosely so as to guide the door and at the same time permit of the door being crowded downwardly and laterally when closed.

The lower edge of the door may slide in a groove formed in the threshold 27 or be otherwise stayed or secured in order to afford a suitable tight joint and the projecting flange of the marginal angle member affords a water table at 28.

From the foregoing description it will be seen that my improved car door affords a convenient and reliable grain door, and that it takes up but little, if any more space within the body of the car than the usual auxiliary and temporary grain doors. Furthermore this door affords the same security as a closure against theft and the elements as the ordinary externally sliding door and obviates entirely the dangers arising from derailment and the expense and delays incident to breakage from external shock.

Obviously my improved door renders the car available for loading with all kinds of freight without delay and presents less obstruction upon the interior of the car than the usual pivoted sliding grain door, while the original cost of construction is less than the combined cost of the standard outside door and the interior grain door. Friction is reduced to a minimum by placing the angle members so as to face the inside side wall of the car and the door is not so apt to bind from the entrance of grain between its outer side and the inner side of the car, the angles affording requisite clearance for dislodgment of any materials which may find entrance between them.

While a car provided with my improved door is particularly adapted for grain, ore, and other fine material; it is equally well adapted for carrying lumber and other bulky freight, and may be perfectly adapted for box and package freight by providing the interior of the car with a door pocket formed of slats or rods, as is common in baggage cars.

While I have described specifically the preferred materials and the form and arrangement of the parts, it is obvious that structural variations may be made, as for example, the body of the door may be flanged to provide the marginal ribs and corrugated to provide the internal ribs thus avoiding riveting. Furthermore, the form, number and size of the sliding sections and the particular mode of mounting and securing them may be varied. These and similar structural variations I deem within the scope of my invention.

I claim—

1. A box freight car having a doorway, a single door of a size to close the entire doorway, and provided with openings for loading and unloading the car and closures for said openings, said door being slidably mounted within the car to move longitudinally therein in upright position toward and away from the doorway to cover and uncover the doorway, and coöperating means on the car and door to draw the latter against the side and floor of the car in the closed position of the door to effect a grain tight and weather tight fit of the door.

2. A box freight car having a doorway, a single door of a size to close the entire doorway, and provided with openings for loading and unloading the car and closures for said openings, said door being slidably mounted within the car to move longitudinally therein in upright position toward and away from the doorway to cover and uncover the doorway, and coöperating means on the car and the door to draw the latter sidewise against the side of the car in the closed position of the door.

3. A box freight car having a doorway, a single door of a size to close the entire doorway, and provided with openings for loading and unloading the car and closures for said openings, said door being slidably mounted within the car to move longitudinally therein in upright position toward and away from the doorway to cover and uncover the doorway, and coöperating means on the car and door to draw the latter down and hold the bottom of the same upon the floor of the car in the closed position of the door.

4. A box freight car having a doorway, a single door of a size to close the entire doorway, and provided with openings for loading and unloading the car and closures for said openings, said door being slidably mounted within the car to move longitudinally therein in upright position toward and away from the doorway to cover and uncover the doorway, coöperating means on the car and the door to draw the latter sidewise against the side of the car in the closed position of the door, and other coöperating means on the car and door to draw the latter down and hold the bottom of the same upon the floor of the car in the closed position of the door.

5. A box freight car having a doorway, a single door of a size to close the entire doorway, said door being slidably mounted within the car to move longitudinally therein in upright position toward and away from the doorway to cover and uncover the doorway, a wicket in the upper portion of the door for use in loading the car, and coöperating means on the car and the door to draw the latter against the side and floor of the car in the closed position of the door to effect a grain tight and weather tight fit of the door.

6. A box freight car having a doorway, a single door of a size to close the entire doorway, said door being slidably mounted within the car to move longitudinally therein in upright position toward and away from the car to cover and uncover the doorway, a wicket in the upper portion of the door for use in loading the car, a wicket in the lower portion of the door for use in unloading the car, and coöperating means on the car and the door to draw the latter against the side and floor of the car in the closed position of the door to effect a grain tight and weather tight fit of the door.

7. A box freight car having a doorway, a single door of a size to close the entire doorway, said door being slidably mounted within the car to move longitudinally therein in upright position toward and away from the doorway to cover and uncover the doorway, devices carried by the door at the top and bottom thereof having beveled nose pieces, coöperating devices upon the side of the car having beveled nose pieces disposed for engagement by the nose pieces on the door to draw the door downwardly and hold the same against the bottom of the car when the door is closed, a wedge piece carried by the outer face of the door, and a coöperating wedge piece upon the side of the car in position for engagement by the wedge piece on the door to draw the latter against the side of the car in the closed position of the door.

HENRY A. CHRISTY.

Witnesses:
C. C. LINTHICUM,
R. S. McCONNELL.